US010394295B2

(12) United States Patent
Rothman et al.

(10) Patent No.: US 10,394,295 B2
(45) Date of Patent: Aug. 27, 2019

(54) STREAMLINED PHYSICAL RESTART OF SERVERS METHOD AND APPARATUS

(71) Applicant: Intel Corporation, Santa Clara, CA (US)

(72) Inventors: Michael A. Rothman, Puyallup, WA (US); Vincent J. Zimmer, Federal Way, WA (US); Jiewen Yao, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 159 days.

(21) Appl. No.: 15/598,032

(22) Filed: May 17, 2017

(65) Prior Publication Data

US 2018/0335816 A1   Nov. 22, 2018

(51) Int. Cl.
| | |
|---|---|
| G06F 1/24 | (2006.01) |
| G06F 9/44 | (2018.01) |
| G06F 9/455 | (2018.01) |
| G06F 1/32 | (2019.01) |
| G06F 21/57 | (2013.01) |
| H04L 9/08 | (2006.01) |
| G06F 9/4401 | (2018.01) |
| G06F 1/3206 | (2019.01) |
| G06F 9/445 | (2018.01) |

(52) U.S. Cl.
CPC .............. *G06F 1/24* (2013.01); *G06F 1/3206* (2013.01); *G06F 9/4401* (2013.01); *G06F 9/445* (2013.01); *G06F 9/4418* (2013.01); *G06F 9/45558* (2013.01); *G06F 21/572* (2013.01); *H04L 9/0877* (2013.01); *H04L 9/0897* (2013.01); *G06F 2009/45575* (2013.01); *G06F 2221/034* (2013.01); *G06F 2221/2149* (2013.01)

(58) Field of Classification Search
CPC ........ G06F 1/24; G06F 9/4401; G06F 9/4418; G06F 9/445; G06F 9/45558; G06F 1/3206; G06F 21/572; H04L 9/0877
See application file for complete search history.

(56) References Cited

U.S. PATENT DOCUMENTS

| | | | |
|---|---|---|---|
| 7,945,289 B2 * | 5/2011 | Sanders | G06F 1/24 370/908 |
| 9,928,196 B2 * | 3/2018 | Cardinell | G06F 13/385 |
| 10,127,384 B2 * | 11/2018 | Shah | H04L 9/3236 |
| 2018/0032349 A1 * | 2/2018 | Bhimanadhuni | G06F 3/0604 |

* cited by examiner

*Primary Examiner* — Stefan Stoynov
(74) *Attorney, Agent, or Firm* — Schwabe, Williamson & Wyatt, P.C.

(57) ABSTRACT

Apparatuses, methods and storage medium associated with streamlined physical reset are described herein. In embodiments, an apparatus for computing, including streamlined physical reset, may comprise one or more processor cores; memory having a plurality of memory locations; and a basic input/output system (BIOS) to provide basic input/output system services, wherein the BIOS stays within a range of memory locations during each initialization of the BIOS, including an initialization of the BIOS that is part of a physical reset of the apparatus, to streamline the physical reset. Other embodiments may be described and/or claimed.

25 Claims, 6 Drawing Sheets

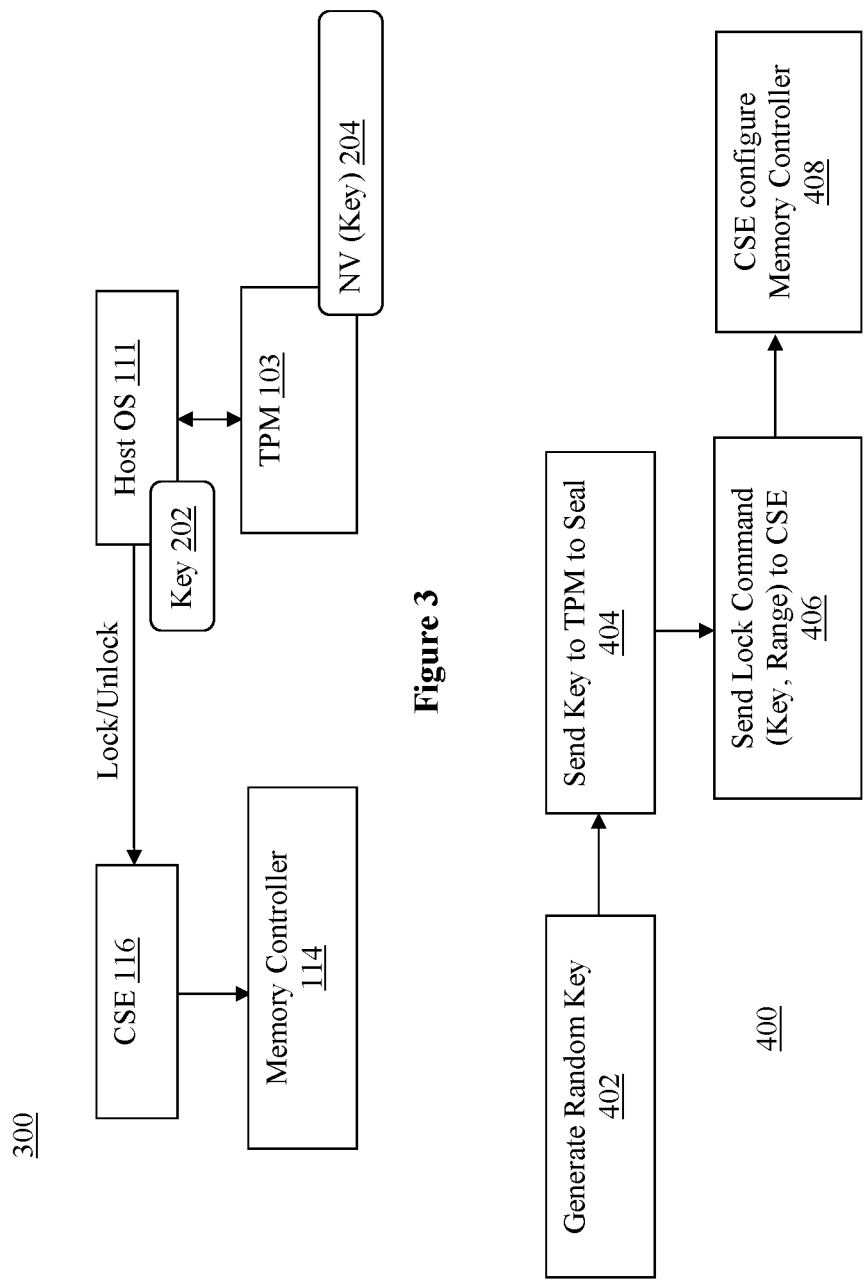

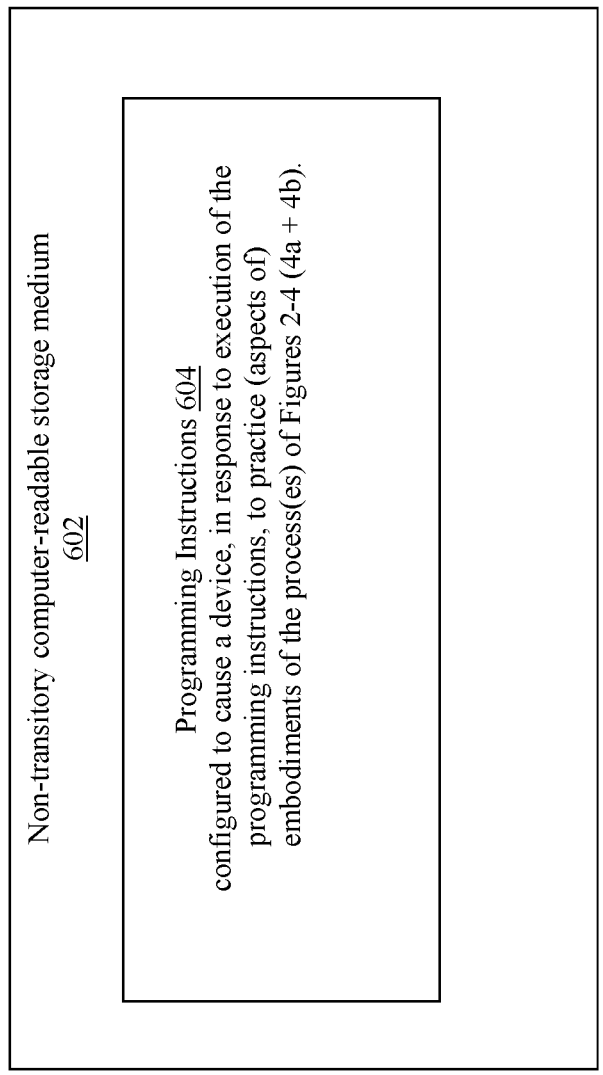

STREAMLINED PHYSICAL RESTART OF SERVERS METHOD AND APPARATUS

TECHNICAL FIELD

The present disclosure relates to the field of computing. More particularly, the present disclosure relates to method, apparatus and storage medium associated with streamlined physical reset of servers.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

One of the biggest problems with managing today's datacenters has to do with server outages/down time. Any downtime in a datacenter is a costly, highly visible affair. The problems are especially amplified for large datacenter providers due to the sheer volume of nodes that they have across their global datacenters. When an IT administrator is managing 100's of thousands of nodes, the mission-critical status of their equipment and the desire to avoid client outages is paramount.

One of the biggest issues that come up in large datacenters has to do with client-reported outages. Under most circumstances, these outages are rooted in the need for a server to physically restart, which in turn causes all of the sessions hosted by the server to be disconnected. Today, server solutions mitigate some of this by doing the equivalent of a kernel soft reboot, which means the platform itself doesn't reset, just the sessions temporarily get restarted. However, there are some system events (e.g. firmware updates which require fabric resets for frequency changes, etc.) which require a platform-level reset. When these happen, it wreaks havoc in the datacenter, especially when you consider there are many thousands of servers deployed in any IT managed datacenter. These occurrences happen much more frequently that one might normally think.

By definition, any server that wants to maintain a 99.999% (five 9's) uptime must not be unavailable for more than 5½ minutes a year. Most server solutions have put in place solutions to address what is otherwise a length initialization time called a KSR (kernel system reset)—this is very much akin to what Linux does with KEXEC by avoiding the full reset of the system. The server can bring down and up a session without having to encumber it with heavy initialization times. However, the initialization times for a full system reset cannot be avoided in some cases, and this is where we find boot times that are often in excess of three minutes. This means that a server can today go through a boot cycle only once a year and hope to maintain its mission critical status. This is substantially an untenable situation for most datacenters.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIGS. 3 and 4a-4b illustrate an example streamlined physical reset process with added security, according to the various embodiments.

FIG. 6 illustrates a storage medium having instructions for practicing methods described, according to various embodiments.

DETAILED DESCRIPTION

Figure 1:
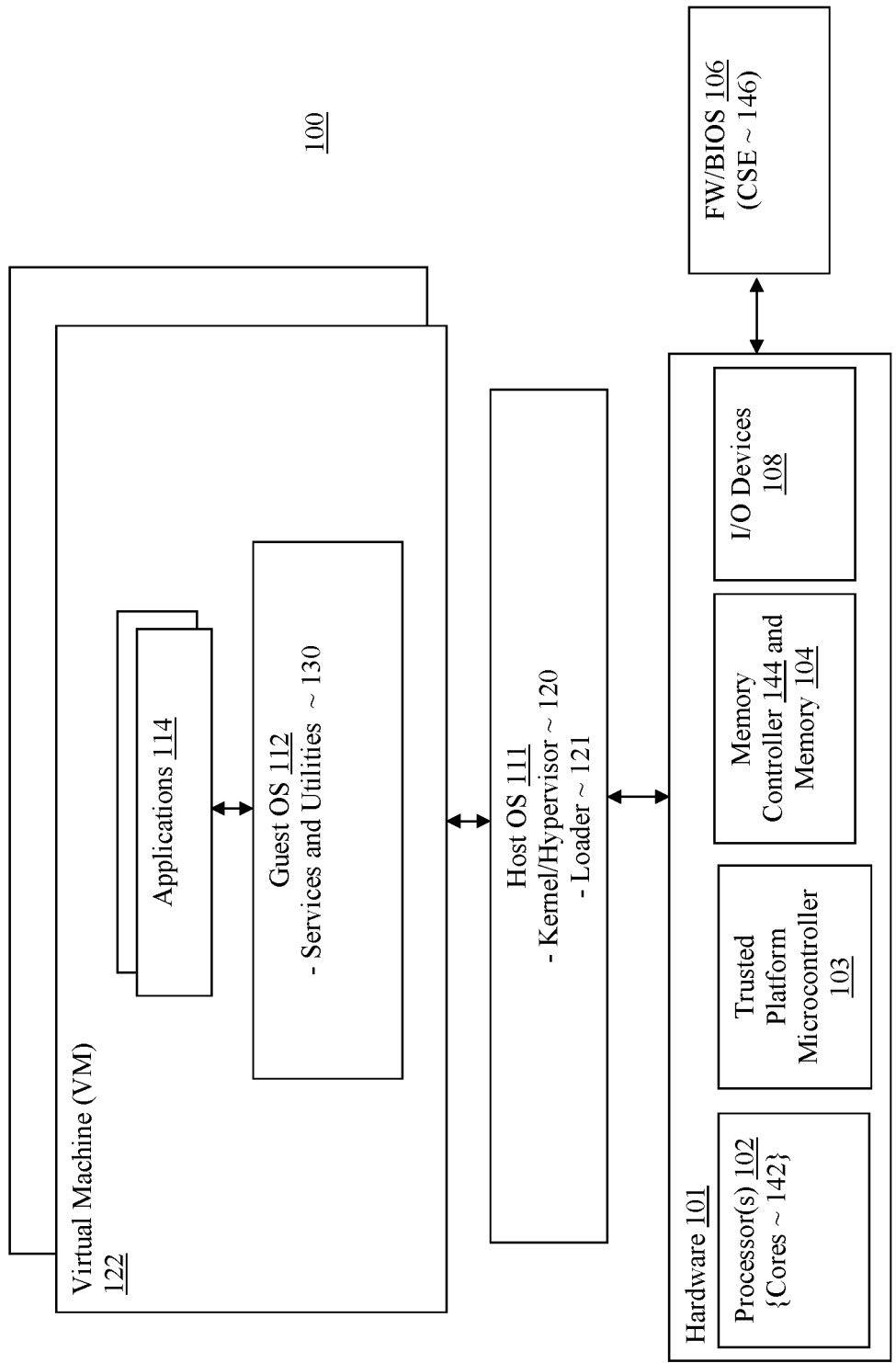
FIG. 1 illustrates a computing device having the streamlined physical reset technology of the present disclosure, according to various embodiments.

Apparatuses, methods and storage medium associated with streamlined physical reset are described herein. In embodiments, an apparatus for computing, including streamlined physical reset, may comprise one or more processor cores; memory having a plurality of memory locations; and a basic input/output system (BIOS) to provide basic input/output system services, wherein the BIOS stays within a range of memory locations during each initialization of the BIOS, including an initialization of the BIOS that is part of a physical reset of the apparatus, to enable the physical reset to be streamlined. In embodiments, the BIOS may reserve the range of memory locations. Further, the BIOS may make available to a host operating system of the apparatus, the reserved range of memory locations, to allow the host operating system of the apparatus to leverage on the BIOS not going beyond the reserved range of memory locations during the initialization of the BIOS, to execute a streamlined process that takes a reduced amount of time, during the physical reset of the apparatus.

In embodiments, the apparatus may further include the host operating system, and the host operating system may include a loader, and a kernel or hypervisor; wherein to enable execution of a streamlined process that takes a reduced amount of time, during the physical reset of the apparatus, the kernel or hypervisor, on detection of a firmware soft reset, may establish a resume vector for the loader to use across a physical reset of the apparatus to transfer execution control back to the kernel or hypervisor, bypassing reloading of the kernel or hypervisor, and subsequent launching of a plurality of virtual machines (from mass storage) by the kernel or hypervisor.

In embodiments, the apparatus may further comprise a trusted platform microcontroller to integrate a cryptographic key into a device to secure the device; wherein the BIOS further comprises a cryptographic service engine to provide cryptography services; and wherein the host operating system is to further generate a cryptographic key, provide the cryptographic key to the trusted platform microcontroller to seal the cryptographic key, and provide the cryptographic key to the cryptographic service engine to lock the range of memory locations reserved for use by the BIOS during initialization of the BIOS, to add security to the streamlined physical reset process.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a programmable combinatorial logic circuit (such as a Field Programmable Gate Array (FPGA)), a processor (shared, dedicated, or group) and/or memory (shared, dedicated, or group) that execute one or more software or firmware programs, and/or other suitable components that provide the described functionality.

Referring now to FIG. 1, wherein a computing device having the streamlined physical reset technology of the present disclosure, according to various embodiments, is shown. As illustrated, in embodiments, computing device 100 may include hardware 101, firmware (FW)/basic input/output services (BIOS) 106, and host operating system (OS) 111, coupled with each other as shown to host a number of virtual machines (VM) 122. In particular, hardware 101, FW/BIOS 106, and host OS 111 may be respectively incorporated with aspects of the streamlined physical reset technology of the present disclosure to collaborate with each other, to enable physical reset of computing device 100 to be performed in a streamlined, reduced amount of time basis, thereby reducing the outage and downtime of computing device 100.

In embodiments, hardware 101 may include one or more processors 102, memory controller 144 and memory 104 coupled with each other to execute host OS 111 and VMs 122. Each processor 102 may include multiple processor cores 142, which may be any 32-bits or 64-bits processor cores known in the art. Similarly, memory 104 may be any volatile or non-volatile memory known in the art, and memory controller 144 may be any one of a number of memory controllers known controlling access of volatile or non-volatile memory. Further, memory 104 may include a hierarchy of cache memory and system memory. Both the cache and system memory may be respectively organized into cache pages and memory pages.

In embodiments, FW/BIOS 106 may be configured to provide basic input/output services to host OS 111. In particular, FW/BIOS 106 may be configured stay within a range of memory location for each initialization, including an initialization that is a part of a physical reset of computing device 100, to enable the physical reset to be streamlined. FW/BIOS 106 may be configured to reserve a range of memory locations of memory 104 for use during an initialization of the FW/BIOS 106. FW/BIOS 106 may further be configured to expose the reserved range of memory locations to host OS 111, to allow host OS 111 to leverage on the fact that FW/BIOS 106 will not go beyond the reserved range of memory locations during an initialization resulted from a physical reset, thereby allowing host OS 111 to perform a streamlined physical reset, to reduce an amount of time required. Except for aspects of the streamlined physical reset technology incorporated with FW/BIOS 106, FW/BIOS 106 otherwise may be any one of such elements known in the art. In embodiments, FW/BIOS 106 may support the Unified Extensible Firmware Interface (UEFI), in particular the UEFI as defined by UEFI Specification Version 2.6 published by the UEFI Forum. For these embodiments, FW/BIOS 106 may expose the reserved range of memory locations to host OS 111 by storing the reserved range of memory locations in UEFI's System Configuration Table.

In embodiments, host OS 111 may include a kernel and/or hypervisor 120, and loader 121. In particular, to enable execution of a streamlined process that takes a reduced amount of time during a physical reset of the apparatus, host OS 111 may be configured to establish, on detection of a firmware soft reset, a resume vector for the loader to use across a physical reset of the apparatus, to transfer execution control back to kernel/hypervisor 120, bypassing re-loading of kernel/hypervisor 120, as well as re-launching of VMs 122. Except for aspects of the streamlined physical reset technology incorporated with host OS 111, host OS/111 otherwise may be any one of a number of host OS known in the art.

Each VM 122 may include guest OS 112 and a number of applications 114. Guest OS 112 may include a number of services and/or utilities 130. Guest OS 112 may be any one of a number of OS known in the art, e.g., the Windows OS from Microsoft® Corporation. Applications 114 may be any application known in the art.

In embodiments, hardware 101 may further include a trusted platform microcontroller (TPM) 103 and input/output (I/O) devices 108. TPM 103 may be configured to provide various security services, including integration of a cryptographic key into a device to secure the device; and I/O devices 108 may be configured to provide a number of input/output services. For these embodiments, FW/BIOS 106 may further include cryptographic service engine (CSE) 146 to provide various cryptography services. Additionally, kernel/hypervisor 120 may be further configured to cooperate with FW/BIOS 106 to leverage on these facilities to add security to the streamlined physical reset process. Kernel/hypervisor 120 may be configured to generate a cryptographic key for the reserved range of memory locations used by the FW/BIOS 106 during initialization of FW/BIOS 106, provide the cryptographic key to the TPM 103 to seal the cryptographic key, and provide the cryptographic key to the cryptographic service engine 146 to configure memory controller 144 to lock the reserved range of memory locations, and keep the reserved range of memory locations locked until the unsealed cryptographic key is presented to cryptographic service engine 146 again. Except for their usage to secure the reserved range of memory locations to facilitate the streamlined process to physically reset computing device 100, TPM 103 and CSE 146 may otherwise may any one of a number of these elements known in the art. Examples of I/O devices 108 may include communication or networking interfaces, such as Ethernet, WiFi, 3G/4G, Bluetooth®, Near Field Communication, Universal Serial Bus (USB) and so forth, storage devices, such as solid state, magnetic and/or optical drives, input devices, such as keyboard, mouse, touch sensitive screen, and so forth, and output devices, such as, display devices, printers, and so forth.

Figure 2:
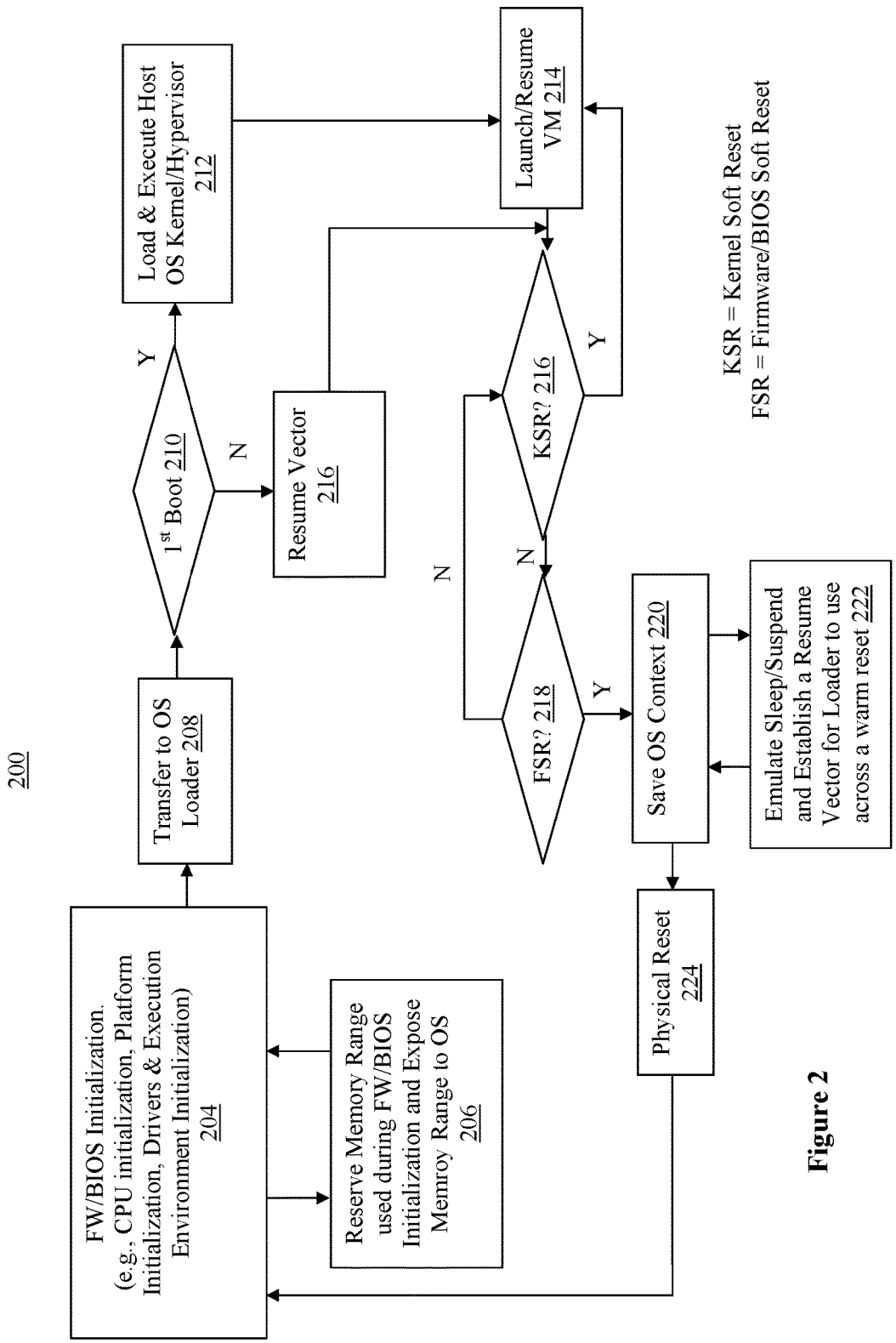
FIG. 2 illustrates an example streamlined physical reset process, according to various embodiments.

Referring now to FIG. 2, wherein an example streamlined physical reset process, according to various embodiments, is shown. As illustrated, streamlined physical reset process 200 may include various operations performed at blocks 204-226. The operations may be performed e.g., by the earlier described FW/BIOS 106 and host OS 111 (loader 121 and kernel/hypervisor 120).

Process 200 may start at block 204. At block 204, FW/BIOS may start, in response to e.g., a power on or physical reset. During FW/BIOS initialization, the central processing units/cores, platform components, driver and execution environment may be successively initialized. At a first initialization of the FW/BIOS, process 200 may also branch off to block 206, at one or more points in time. At block 206, FW/BIOS 106 may reserve a range of memory locations of system memory of the computing device for use by FW/BIOS 106 during initialization. As described earlier, FW/BIOS 106 may be configured to not go beyond the reserved range of memory locations during subsequent initializations of FW/BIOS 106, including when the subsequent initialization of FW/BIOS 106 is part of a physical reset of the computing device, to enable the physical reset to be streamlined, taking a reduced amount of time. On reservation, FW/BIOS 106 may expose the reserved range of memory locations to host OS 111, to allow host OS 111 to leverage on the fact that FW/BIOS 106 will not go beyond the range during a subsequent initialization as part of a physical reset of the computing device, thereby allowing host OS 111 to practice the streamlined physical reset process, to reduce an amount of time it takes to physically reset the computing device. In embodiments, FW/BIOS 106 may expose the reserved range of memory locations to host OS 111 by storing the reserved range of memory locations in a configuration table accessible to host OS 111, e.g., the UEFI System Configuration Table when UEFI is supported by FW/BIOS 106 and host OS 111.

From block 204, process 200 may proceed to block 208, where execution control may be transferred to loader 121 of host OS 111. Next, at block 210, loader 121 may determine whether the computing device is performing a first boot. If a result of the determination indicates that the computing system is going through the first boot, process 200 may proceed to block 212. At block 212, loader 121 may load and start execution of host OS kernel/hypervisor 120. Thereafter, at block 214, host OS kernel/hypervisor 120 may launch various VMs 122 from scratch (e.g., from mass storage of the computing device).

On launching the various VMs 122, process 200 may proceed to blocks 216 and 218. At block 216 and 218, kernel/hypervisor 120 of host OS 111 may iteratively determine whether to trigger a soft reset (KSR) or detect a soft reset has been triggered by the FW/BIOS (FSR).

On determination of a FSR, process 200 may proceed to block 220. At block 220, kernel/hypervisor 120 may save the context of host OS 111. As part of the process of saving the context of host OS 111, process 200 may also branch to block 222. At block 222, a resume vector may be set up by kernel/hypervisor 120 for loader 121 to use across a physical reset to return execution control to kernel/hypervisor 120. In embodiments, kernel/hypervisor 120 may emulate a sleep state suspend codepath to establish the resume vector for loader 121. In embodiments, where Advanced Configuration and Power Interface (ACPI) is supported, kernel/hypervisor 120 may emulate a S3 state (without actually triggering the S3 hardware port) to establish the resume vector for loader 121.

On saving the context of host OS 111 (including setting up the resume vector for loader 121), process 200 may proceed to block 224. At 224, kernel/hypervisor 120 may trigger a physical reset to reset the hardware of the computing system.

From block 224, process 200 may proceed to block 204, and continue therefrom as earlier described. However, now at block 210, on receipt of execution control again after FW/BIOS initialization, a result of the determination will indicate to loader 121 that this is not a first boot, therefore, process 200 may proceed to block 216. At block 216, loader 121 may jump to the resume vector set up by kernel/hypervisor 120, prior to the physical reset, and transfer execution control to kernel/hypervisor 120, resuming kernel/hypervisor 120 and skipping the reloading of kernel/hypervisor 120 at block 212 and relaunching of VMs at block 214 (leveraging on the fact that the re-initialization of FW/BIOS 106 has not changed anything beyond the range of memory locations reserved form FW/BIOS 106).

On receipt of execution control, process 200 may now proceed to blocks 216 and 218 as earlier described. However, now at block 216, a result of the determination will indicate to kernel/hypervisor 120 to trigger a soft reset, therefore, process 200 may proceed to block 214. At block 214, kernel/hypervisor 120 may resume VMs 122 from memory.

Accordingly, the amount of time required for the physical reset may be reduced. Further, no disconnect and reconnect of the client sessions serviced by VMs 122 is required, potentially improving user experience.

In embodiments, if there are any concerns about FW/BIOS 106 violating its sand-box (going beyond the reserved range of memory locations), or having direct memory access (DMA) attacks on the preserved kernel/hypervisor memory across re-boots, virtualization technology extension (VT-x) and/or virtualization technology direct I/O (VT-d) may be used to protect the preserved memory from potentially malevolent adapter cards, debug interfaces, or errant FW/BIOS flows. In addition, kernel/hypervisor 121 can finger-print critical regions of the memory and re-evaluate these regions for integrity on restart. Still further, trusted execution technology (TXT) or trust platform module/microcontroller (TPM) seal and unseal operations may be employed to bracket these transitions with the sealed value being an integrity metric.

Figure 4B:
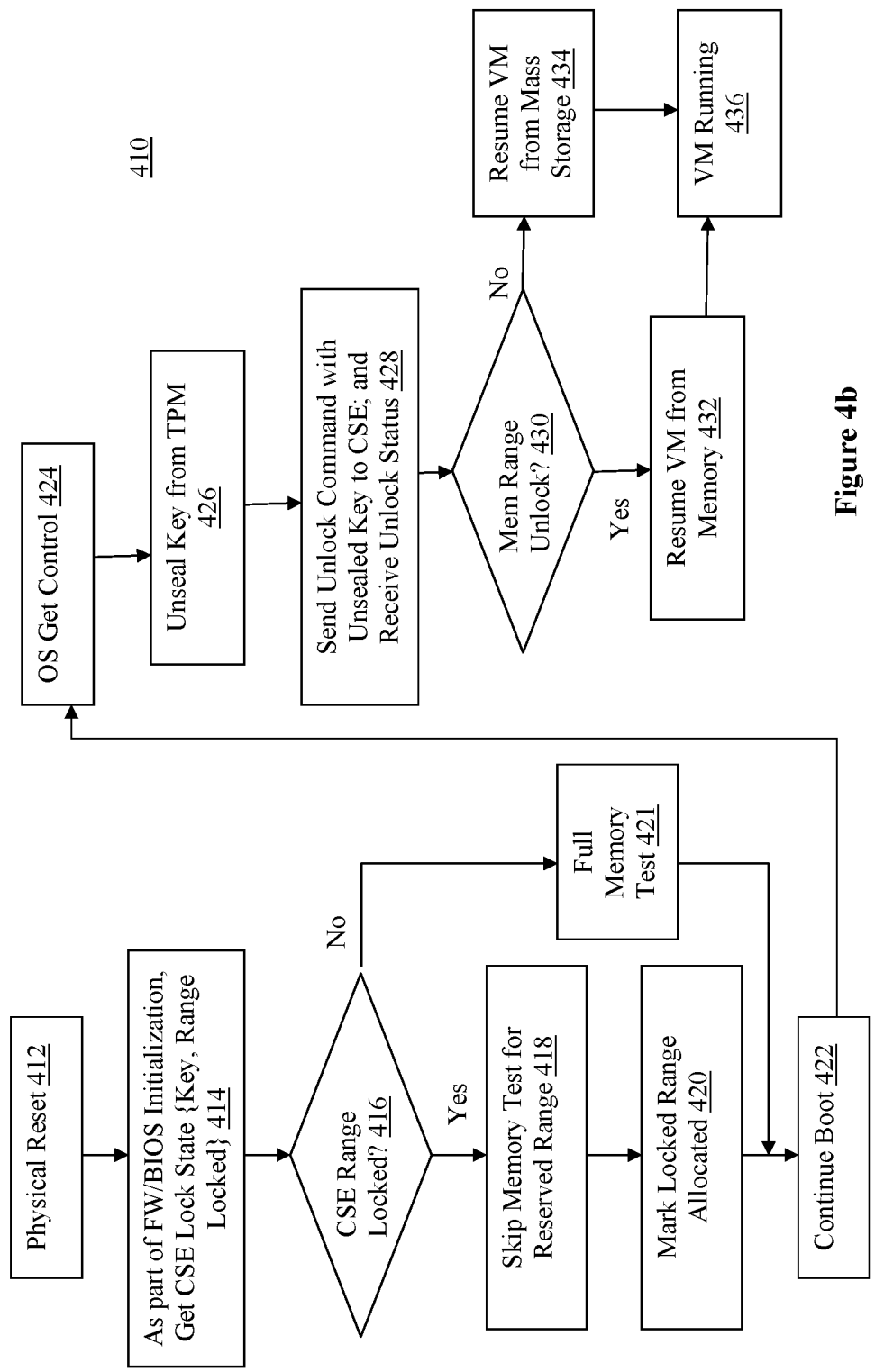

Referring now FIGS. 3 and 4a-4b, wherein an example streamlined physical reset process with added security using TPM, according to the various embodiments, is shown. FIG. 3 illustrates a component view of the example streamlined physical reset process with added security using TPM, whereas FIGS. 4a and 4b respectively illustrates the set up 400 and operational 410 aspects of the example streamlined physical reset process with added security using TPM.

As illustrated in FIGS. 3 and 4a, during set up, host OS 111 (e.g., kernel/hypervisor 120) may generate a random key 202 for the range of memory locations reserved for the FW/BIOS (block 402). On generation of random key 202, host OS 111 (e.g., kernel/hypervisor 120) may send random key 202 to TPM 103 to store and seal (NV(Key) 204) (block 404). On sealing random key 202, host OS 111 (e.g., kernel/hypervisor 120) may send a lock command (with random key 202 and the FW/BIOS reserved memory range) to CSE 116 to lock the FW/BIOS reserved memory range (block 406). On receipt CSE 116 may instruct/configure memory controller 114 to lock the FW/BIOS reserved memory range (block 408).

As illustrated in FIG. 3 and FIG. 4b, on (physical) reset (after set up) 412, as part of the initialization, FW/BIOS 106 may obtain the state of CSE (using random key 202, and the memory range locked), block 414. Next, at block 416, a determination may be made on whether the returned CSE state indicates/confirms that the memory range is indeed locked. If the returned CSE state indicates that the memory range is not locked, process 410 may proceed to block 421. At block 421, full memory test may be performed.

However, if the returned CSE state indicates/confirms that the memory range is indeed locked, process 410 may proceed to block 418. At block 418, partial memory test may be performed, skipping the reserved memory range. Next, at block 420, the locked reserved memory range may be marked as allocated.

From blocks 420 and 421, process 410 may proceed to block 422, where the reboot process may continue, with host OS 111 (e.g., kernel/hypervisor 120) getting control at block 424.

Next, at block 426, host OS 111 (e.g., kernel/hypervisor 120) may retrieve the unsealed key from TPM 103. Then, at block 428, host OS 111 (e.g., kernel/hypervisor 120) may send the unlock command with the unsealed key to CSE 116, and in response, received confirmation from CSE 116 that the reserved range of memory locations has been unlocked (after CSE 116 reconfigure memory controller 114 to unlock the reserved range of memory locations, on confirmation that the provided unsealed cryptographic key matches the earlier provided cryptographic key used to lock the reserved range of memory location).

At block 430, a determination may be made on whether the reserved range of memory locations has been successfully unlocked. If a result of the determination indicates the reserved range of memory locations has been successfully unlocked, at block 432, VMs 122 may be resumed from memory. Otherwise, at block 434, VMs 122 may be resumed from mass storage.

Thereafter, at block 436, VMs 122 may run to service their client sessions. If the VMs 122 were resumed from memory, client sessions supported by VMs 122 will not have to be disconnected and reconnected, potentially improving user experience.

Figure 5:
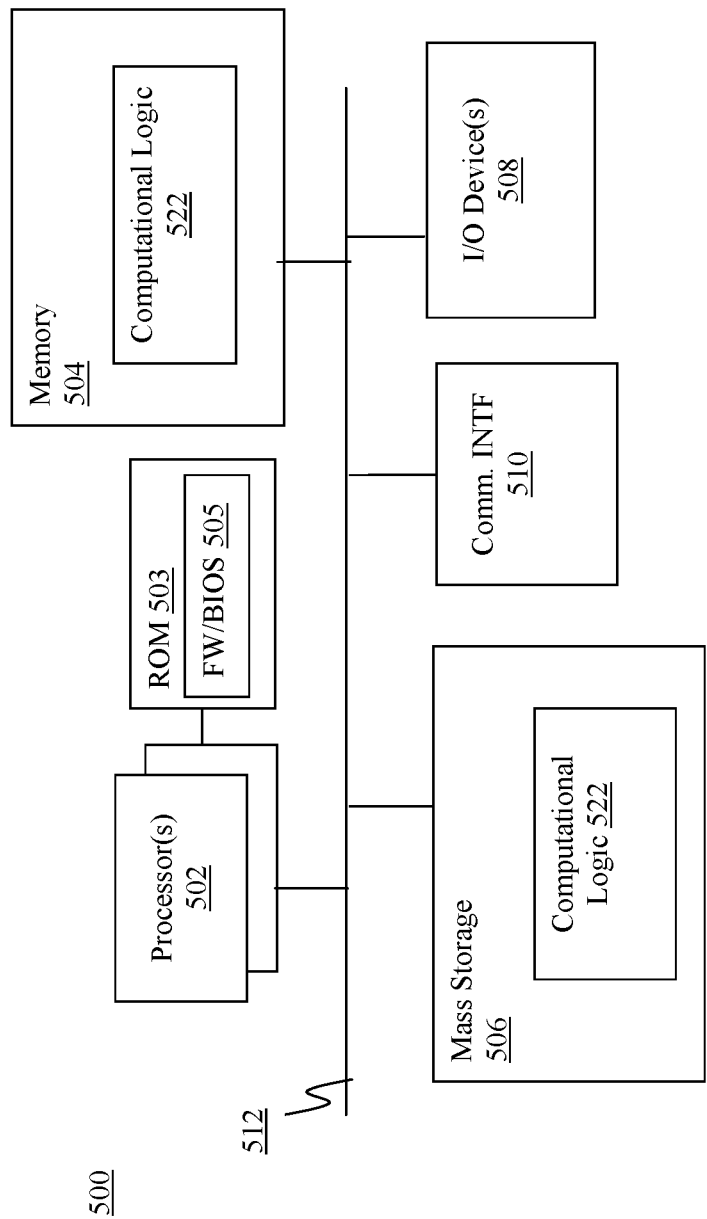
FIG. 5 illustrates an example computer system suitable for use to practice aspects of the present disclosure, according to various embodiments.

FIG. 5 illustrates an example computer system that may be suitable for use to practice selected aspects of the present disclosure. As shown, computer 500 may include one or more processors with multiple processor cores 502, read-only memory (ROM) 503, and system memory 504. Additionally, computer system 500 may include mass storage devices 506. Example of mass storage devices 506 may include, but are not limited to, tape drives, hard drives, compact disc read-only memory (CD-ROM) and so forth). Further, computer system 500 may include input/output devices 508 (such as display, keyboard, cursor control and so forth) and communication interfaces 510 (such as network interface cards, modems and so forth). The elements may be coupled to each other via system bus 512, which may represent one or more buses. In the case of multiple buses, they may be bridged by one or more bus bridges (not shown).

Each of these elements may perform its conventional functions known in the art. In particular, ROM 503 may include FW/BIOS 505 incorporated with earlier described FW/BIOS aspects of the streamlined physical reset technology of the present disclosure. System memory 504 and mass storage devices 506 may be employed to store a working copy and a permanent copy of the programming instructions implementing host OS 111 (including loader 121 and/or kernel/hypervisor 120 with OS aspects of the streamlined physical reset technology of the present disclosure), guest OS 112 and/or applications 114, collectively referred to as computational logic 522. The various elements may be implemented by assembler instructions supported by processor(s) 502 or high-level languages, such as, for example, C, that can be compiled into such instructions.

The number, capability and/or capacity of these elements 510-512 may vary, depending on whether computer system 500 is used as a mobile device, such as a wearable device, a smartphone, a computer tablet, a laptop and so forth, or a stationary device, such as a desktop computer, a server, a game console, a set-top box, an infotainment console, and so forth. Otherwise, the constitutions of elements 510-512 are known, and accordingly will not be further described.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 6 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 602 may include a number of programming instructions 604. Programming instructions 604 may be configured to enable a device, e.g., computer 500, in response to execution of the programming instructions, to implement (aspects of) the streamlined physical reset technology of the present disclosure. In alternate embodiments, programming instructions 604 may be disposed on multiple computer-readable non-transitory storage media 602 instead. In still other embodiments, programming instructions 604 may be disposed on computer-readable transitory storage media 602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Referring back to FIG. 5, for one embodiment, at least one of processors 602 may be packaged together with memory having FW/BIOS aspects of the streamlined physical reset technology of the present disclosure. For one embodiment, at least one of processors 602 may be packaged together with memory having FW/BIOS aspects of the streamlined physical reset technology of the present disclosure, to form a System in Package (SiP). For one embodiment, at least one of processors 602 may be integrated on the same die with memory having FW/BIOS aspects of the streamlined physical reset technology of the present disclosure. For one embodiment, at least one of processors 602 may be packaged together with memory having FW/BIOS aspects of the streamlined physical reset technology of the present disclosure, to form a System on Chip (SoC). For at least one embodiment, the SoC may be utilized in, e.g., but not limited to, a wearable device, a smartphone or a computing tablet.

Thus various example embodiments of the present disclosure have been described including, but are not limited to:

Example 1 may be an apparatus for computing, including streamlined physical reset, comprising: one or more processor cores; memory having a plurality of memory locations; and a basic input/output system (BIOS) to provide basic input/output system services, wherein the BIOS stays within a range of memory locations during each initialization of the BIOS, including an initialization of the BIOS that is part of a physical reset of the apparatus, to streamline the physical reset.

Example 2 may be example 1, wherein the BIOS may reserve the range of memory locations.

Example 3 may be example 2, wherein the BIOS may further make available to a host operating system of the apparatus, the reserved range of memory locations, to allow the host operating system of the apparatus to leverage on the BIOS not going beyond the reserved range of memory locations during the initialization of the BIOS, to execute a streamlined process that takes a reduced amount of time, during the physical reset of the apparatus.

Example 4 may be example 3, wherein the BIOS may store the reserved range of memory locations in a firmware-operating system interface configuration table, to make available to the host operating system of the apparatus, the reserved range of memory locations.

Example 5 may be any one of examples 1-4, further comprising a host operating system, and the host operating system may include a loader, and a kernel or a hypervisor; wherein to streamline the physical reset of the apparatus, the kernel or hypervisor, on detection of a firmware soft reset, may establish a resume vector for the loader to use across a physical reset of the apparatus to transfer execution control back to the kernel or hypervisor, bypassing reloading of the kernel or hypervisor, and subsequent launching of a plurality of virtual machines by the kernel or hypervisor.

Example 6 may be example 5, wherein the kernel or hypervisor, on detection of a firmware soft reset, may emulate a sleep state suspend code path to establish the resume vector for the loader to use across a physical reset of the apparatus.

Example 7 may be example 5, wherein the loader, on receipt of execution control, may determine whether the host operating system had previously gone into the sleep state, and on determination that the host operating system had previously gone into the sleep state, the loader may continue execution jumping to the resume vector to transfer execution control back to the kernel or hypervisor, bypassing reloading of the kernel or hypervisor, and subsequent launching of the virtual machines by the kernel or hypervisor.

Example 8 may be example 7, wherein on determination that the host operating system had not previously gone into the sleep state, the loader may load the kernel or hypervisor for execution.

Example 9 may be example 8, wherein on receipt of execution control, the kernel or hypervisor may launch the virtual machines.

Example 10 may be example 7, wherein the kernel or hypervisor may further determine whether a kernel soft reset should be triggered, and on determination that a kernel soft reset should not be triggered, may determine whether there has been a firmware soft reset.

Example 11 may be example 10, wherein on determination that there has been a firmware soft reset, the kernel or hypervisor may save a context of the apparatus, and trigger a physical reset of the apparatus.

Example 12 may be example 5, may further comprise a trusted platform microcontroller to integrate a cryptographic key into a device to secure the device; wherein the BIOS may further comprise a cryptographic service engine to provide cryptography services; and wherein the kernel or hypervisor may further generate a cryptographic key, provide the cryptographic key to the trusted platform microcontroller to seal the cryptographic key, and provide the sealed cryptographic key to the cryptographic service engine to lock the range of memory locations reserved for use by the BIOS during initialization of the BIOS.

Example 13 may be example 12, wherein on receipt of execution control, subsequent to the sealing of the cryptographic key, and locking of the reserved range of memory locations, the kernel or hypervisor may retrieve the cryptographic key, unsealed, from the trusted platform microcontroller, and provide the unsealed cryptographic key to the cryptographic service engine to unlock the reserved range of memory locations.

Example 14 may be example 13, wherein on successful unlocking of the reserved range of memory locations, the kernel or hypervisor may resume the virtual machines from memory.

Example 15 may be a method for computing, including streamlined physical reset, comprising: on detection of a firmware soft reset, emulating, by a kernel or hypervisor of a host operating system of an apparatus, a sleep state suspend codepath; and establishing, by the kernel or hypervisor, a resume vector for a loader of the host operating system, to use across a physical reset of the apparatus to transfer execution control back to the kernel or hypervisor, to bypass reloading of the kernel or hypervisor, and subsequent launching of a plurality of virtual machines by the kernel or hypervisor, to streamline a physical reset of the apparatus.

Example 16 may be example 15, further comprising on receiving execution control, determining, by the loader, whether the host operating system had previously gone into the sleep state, and on determination that the host operating system had previously gone into the sleep state, continuing execution, by the loader, jumping to the resume vector to transfer execution control back to the kernel or hypervisor, bypassing reloading of the kernel or hypervisor, and subsequent launching of the virtual machines by the kernel or hypervisor.

Example 17 may be example 16, further comprising, on determining that the host operating system had not previously gone into the sleep state, loading, by the loader, the kernel or hypervisor for execution.

Example 18 may be example 17, further comprising on receiving execution control, launching, by kernel or hypervisor, the virtual machines.

Example 19 may be example 16, further comprising determining, by the kernel or hypervisor, whether a kernel soft reset should be triggered, and on determining that a kernel soft reset should not be triggered, determining, by the kernel or hypervisor, whether there has been a firmware soft reset.

Example 20 may be example 19, further comprising on determining that there has been a firmware soft reset, saving, by the kernel or hypervisor, a context of the apparatus, and triggering, by the kernel or hypervisor, a physical reset of the apparatus.

Example 21 may be any one of examples 15-20, further comprising generating, by the kernel or hypervisor, a cryptographic key; providing, by the kernel or hypervisor, the cryptographic key to a trusted platform microcontroller of the apparatus to seal the cryptographic key; and providing, by the kernel or hypervisor, the sealed cryptographic key to a cryptographic service engine of a basic input/output system (BIOS) to lock a range of memory locations reserved for use by the BIOS during initialization of the BIOS.

Example 22 may be example 21, further comprising on receiving execution control, subsequent to the sealing of the cryptographic key, and locking of the reserved range of memory locations, retrieving, by the kernel or hypervisor, the cryptographic key, unsealed, from the trusted platform microcontroller, and providing, by the kernel or hypervisor, the unsealed cryptographic key to the cryptographic service engine to unlock the reserved range of memory locations.

Example 23 may be example 22, further comprising on successful unlocking of the reserved range of memory locations, resuming, by the kernel or hypervisor, the virtual machines from memory.

Example 24 may be one or more computer-readable media (CRM) comprising instructions that cause a computer device, in response to execution of the instructions by a processor of the computer device, to provide: a kernel or hypervisor of a host operating system to generate a cryptographic key, provide the cryptographic key to a trusted platform microcontroller of the computer device to seal the cryptographic key, and provide the sealed cryptographic key to a cryptographic service engine of a basic input/output system (BIOS) of the computer device to lock a range of memory locations of a memory reserved for use by the BIOS during initialization of the BIOS; wherein the BIOS stays within the reserved range of memory locations during the initialization of the BIOS, including when the initialization of the BIOS is part of a physical reset of the computer device, to streamline the physical reset.

Example 25 may be example 24, wherein the kernel or hypervisor, on receipt of execution control, subsequent to the sealing of the cryptographic key, and locking of the reserved range of memory locations, may retrieve the cryptographic key, unsealed, from the trusted platform microcontroller, and provides the unsealed cryptographic key to the cryptographic service engine to unlock the reserved range of memory locations.

Example 26 may be example 25, wherein the kernel or hypervisor, on successful unlocking of the reserved range of memory locations, may resume the virtual machines from memory.

Example 27 may be example 24-26, wherein the kernel or hypervisor may further emulate, on detection of a firmware soft reset, a sleep state suspend codepath, and establish a resume vector for a loader of the host operating system, to use across a physical reset of the computer device to transfer execution control back to the kernel or hypervisor, to bypass reloading of the kernel or hypervisor, and subsequent launching of a plurality of virtual machines by the kernel or hypervisor, to streamline a physical reset of the apparatus.

Example 28 may be example 27, wherein the loader may further determine, on receipt of execution control, whether the host operating system had previously gone into the sleep state, and on determination that the host operating system had previously gone into the sleep state, continue execution, jumping to the resume vector to transfer execution control back to the kernel or hypervisor, bypassing reloading of the kernel or hypervisor, and subsequent launching of the virtual machines by the kernel or hypervisor.

Example 29 may be example 28, wherein the loader may further load, on determination that the host operating system had not previously gone into the sleep state, the kernel or hypervisor for execution.

Example 30 may be example 29, wherein the kernel or hypervisor may further launch, on receipt of execution control, the virtual machines.

Example 31 may be example 28, wherein the kernel or hypervisor may further determine whether a kernel soft reset should be triggered, and on determination that a kernel soft reset should not be triggered, determine whether there has been a firmware soft reset.

Example 32 may be example 31, wherein the kernel or hypervisor may further save, on determination that there has been a firmware soft reset, a context of the computer device, and trigger a physical reset of the apparatus.

Example 33 may be an apparatus for computing, including streamlined physical reset, comprising: a basic input/output system (BIOS) that may include means for reserving a range of memory locations for use during an initialization of the BIOS, where the BIOS does not go beyond the reserved range of memory locations during the initialization of the BIOS, including when the initialization of the BIOS is part of a physical reset of the apparatus; and a host operating system, wherein the host operating system may include: a loader; and a kernel or hypervisor having means for emulating, on detection of a firmware soft reset, a sleep state suspend codepath; and means for establishing a resume vector for the loader to use across a physical reset of the apparatus to transfer execution control back to the kernel or hypervisor, to bypass reloading of the kernel or hypervisor, and subsequent launching of a plurality of virtual machines by the kernel or hypervisor, to streamline the physical reset of the apparatus.

Example 34 may be example 33, wherein the BIOS may further make available to the host operating system, the reserved range of memory locations, to allow the host operating system of the apparatus to leverage on the BIOS not going beyond the reserved range of memory locations during the initialization of the BIOS, to execute the streamlined process that takes a reduced amount of time, during the physical reset of the apparatus.

Example 35 may be example 33, wherein the loader, on receipt of execution control, may determine whether the host operating system had previously gone into the sleep state, and on determination that the host operating system had previously gone into the sleep state, the loader may continue execution jumping to the resume vector to transfer execution control back to the kernel or hypervisor, bypassing reloading of the kernel or hypervisor, and subsequent launching of the virtual machines by the kernel or hypervisor.

Example 36 may be example 33, wherein the kernel or hypervisor may further comprise: means for determining whether a kernel soft reset should be triggered, and on determining that a kernel soft reset should not be triggered, determining whether there has been a firmware soft reset.

Example 37 may be example 36, the kernel or hypervisor may further comprise means for saving, on determination that there has been a firmware soft reset, a context of the apparatus, and triggering a physical reset of the apparatus.

Example 38 may be any one of examples 33-37, further comprising a trusted platform microcontroller to integrate a cryptographic key into a device to secure the device; wherein the BIOS may further comprise a cryptographic service engine to provide cryptography services; and wherein the kernel or hypervisor may further comprise means for generating a cryptographic key, providing the cryptographic key to the trusted platform microcontroller to seal the cryptographic key, and providing the sealed cryptographic key to the cryptographic service engine to lock the range of memory locations reserved for use by the BIOS during initialization of the BIOS.

Example 39 may be example 38, wherein the kernel or hypervisor may further comprise means for retrieving the cryptographic key, unsealed, from the trusted platform microcontroller, on receipt of execution control, subsequent to the sealing of the cryptographic key, and locking of the reserved range of memory locations, and providing the unsealed cryptographic key to the cryptographic service engine to unlock the reserved range of memory locations.

Example 40 may be example 39, wherein the kernel or hypervisor may further comprise means for resuming, on successful unlocking of the reserved range of memory locations, the virtual machines from memory.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus for computing, including streamlined physical reset, comprising:
    one or more processor cores;
    memory having a plurality of memory locations; and
    a basic input/output system (BIOS) to provide basic input/output system services, wherein the BIOS stays within a range of memory locations during each initialization of the BIOS, including an initialization of the BIOS that is part of a physical reset of the apparatus, to streamline the physical reset.

2. The apparatus of claim 1, wherein the BIOS is to reserve the range of memory locations.

3. The apparatus of claim 2, wherein the BIOS is to further make available to a host operating system of the apparatus the reserved range of memory locations, to allow the host operating system of the apparatus to leverage on the BIOS not going beyond the reserved range of memory locations during the initialization of the BIOS, to execute a streamlined process that takes a reduced amount of time, during the physical reset of the apparatus.

4. The apparatus of claim 3, wherein the BIOS is to store the reserved range of memory locations in a firmware-operating system interface configuration table, to make available to the host operating system of the apparatus the reserved range of memory locations.

5. The apparatus of claim 1, further comprising a host operating system, and the host operating system includes a loader, and a kernel or a hypervisor; wherein to streamline the physical reset of the apparatus, the kernel or hypervisor, on detection of a firmware soft reset, establishes a resume vector for the loader to use across a physical reset of the apparatus to transfer execution control back to the kernel or hypervisor, bypassing reloading of the kernel or hypervisor, and subsequent launching of a plurality of virtual machines by the kernel or hypervisor.

6. The apparatus of claim 5, wherein the kernel or hypervisor, on detection of a firmware soft reset, emulates a sleep state suspend codepath to establish the resume vector for the loader to use across a physical reset of the apparatus.

7. The apparatus of claim 5, wherein the loader, on receipt of execution control, is to determine whether the host operating system had previously gone into a sleep state, and on determination that the host operating system had previously gone into the sleep state, the loader is to continue execution jumping to the resume vector to transfer execution control back to the kernel or hypervisor, bypassing reloading of the kernel or hypervisor, and subsequent launching of the virtual machines by the kernel or hypervisor.

8. The apparatus of claim 7, wherein on determination that the host operating system had not previously gone into the sleep state, the loader is to load the kernel or hypervisor for execution.

9. The apparatus of claim 8, wherein on receipt of execution control, the kernel or hypervisor is to launch the virtual machines.

10. The apparatus of claim 7, wherein the kernel or hypervisor is to further determine whether a kernel soft reset should be triggered, and on determination that a kernel soft reset should not be triggered, determine whether there has been a firmware soft reset.

11. The apparatus of claim 10, wherein on determination that there has been a firmware soft reset, the kernel or hypervisor is to save a context of the apparatus, and trigger a physical reset of the apparatus.

12. The apparatus of claim 5, further comprising a trusted platform microcontroller to integrate a cryptographic key into a device to secure the device;
    wherein the BIOS further comprises a cryptographic service engine to provide cryptography services; and
    wherein the kernel or hypervisor is to further generate a cryptographic key, provide the cryptographic key to the trusted platform microcontroller to seal the cryptographic key, and provide the sealed cryptographic key to the cryptographic service engine to lock the range of memory locations reserved for use by the BIOS during initialization of the BIOS.

13. The apparatus of claim 12, wherein on receipt of execution control, subsequent to the sealing of the cryptographic key, and locking of the reserved range of memory locations, the kernel or hypervisor is to retrieve the cryptographic key, unsealed, from the trusted platform microcontroller, and provide the unsealed cryptographic key to the cryptographic service engine to unlock the reserved range of memory locations.

14. The apparatus of claim 13, wherein on successful unlocking of the reserved range of memory locations, the kernel or hypervisor is to resume the virtual machines from memory.

15. A method for computing, including streamlined physical reset, comprising:
    on detection of a firmware soft reset, emulating, by a kernel or hypervisor of a host operating system of an apparatus, a sleep state suspend codepath; and
    establishing, by the kernel or hypervisor, a resume vector for a loader of the host operating system, to use across a physical reset of the apparatus to transfer execution control back to the kernel or hypervisor, to bypass reloading of the kernel or hypervisor, and subsequent launching of a plurality of virtual machines by the kernel or hypervisor, to streamline a physical reset of the apparatus.

16. The method of claim 15, further comprising on receiving execution control, determining, by the loader, whether the host operating system had previously gone into the sleep state, and on determination that the host operating system had previously gone into the sleep state, continuing execution, by the loader, jumping to the resume vector to transfer execution control back to the kernel or hypervisor, bypassing reloading of the kernel or hypervisor, and subsequent launching of the virtual machines by the kernel or hypervisor.

17. The method of claim 16, further comprising determining, by the kernel or hypervisor, whether a kernel soft reset should be triggered, and on determining that a kernel soft reset should not be triggered, determining, by the kernel or hypervisor, whether there has been a firmware soft reset.

18. The method of claim 17, further comprising on determining that there has been a firmware soft reset, saving, by the kernel or hypervisor, a context of the apparatus, and triggering, by the kernel or hypervisor, a physical reset of the apparatus.

19. One or more non-transitory computer-readable media (CRM) comprising instructions that cause a computer device, in response to execution of the instructions by a processor of the computer device, to provide:
 a kernel or hypervisor of a host operating system to generate a cryptographic key, provide the cryptographic key to a trusted platform microcontroller of the computer device to seal the cryptographic key, and provide the sealed cryptographic key to a cryptographic service engine of a basic input/output system (BIOS) of the computer device to lock a range of memory locations of a memory reserved for use by the BIOS during initialization of the BIOS;
 wherein the BIOS stays within the reserved range of memory locations during the initialization of the BIOS, including when the initialization of the BIOS is part of a physical reset of the computer device, to streamline the physical reset.

20. The non-transitory CRM of claim 19, wherein the kernel or hypervisor, on receipt of execution control, subsequent to the sealing of the cryptographic key, and locking of the reserved range of memory locations, retrieves the cryptographic key, unsealed, from the trusted platform microcontroller, and provides the unsealed cryptographic key to the cryptographic service engine to unlock the reserved range of memory locations; and wherein the kernel or hypervisor, on successful unlocking of the reserved range of memory locations, resumes virtual machines from memory.

21. The non-transitory CRM of claim 19, wherein the kernel or hypervisor is to further emulate, on detection of a firmware soft reset, a sleep state suspend codepath, and establish a resume vector for a loader of the host operating system, to use across a physical reset of the computer device to transfer execution control back to the kernel or hypervisor, to bypass reloading of the kernel or hypervisor, and subsequent launching of a plurality of virtual machines by the kernel or hypervisor, to streamline a physical reset of an apparatus.

22. The non-transitory CRM of claim 21, wherein the loader is to further determine, on receipt of execution control, whether the host operating system had previously gone into the sleep state, and on determination that the host operating system had previously gone into the sleep state, continue execution, jumping to the resume vector to transfer execution control back to the kernel or hypervisor, bypassing reloading of the kernel or hypervisor, and subsequent launching of the virtual machines by the kernel or hypervisor.

23. The non-transitory CRM of claim 22, wherein the loader is to further load, on determination that the host operating system had not previously gone into the sleep state, the kernel or hypervisor for execution; and wherein the kernel or hypervisor is to further launch, on receipt of execution control, the virtual machines.

24. The non-transitory CRM of claim 22, wherein the kernel or hypervisor is to further determine whether a kernel soft reset should be triggered, and on determination that a kernel soft reset should not be triggered, determine whether there has been a firmware soft reset.

25. The non-transitory CRM of claim 24, wherein the kernel or hypervisor is to further save, on determination that there has been a firmware soft reset, a context of the computer device, and trigger a physical reset of the apparatus.

* * * * *